Jan. 2, 1962 P. A. CLARK ET AL 3,015,528
THRUST BEARINGS
Filed Aug. 15, 1958 5 Sheets-Sheet 2
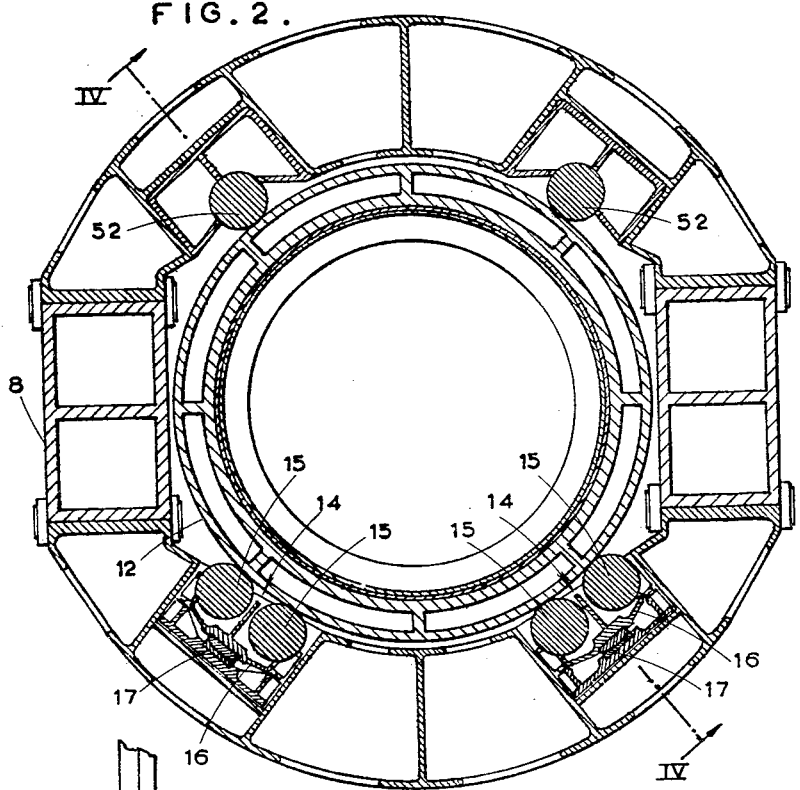
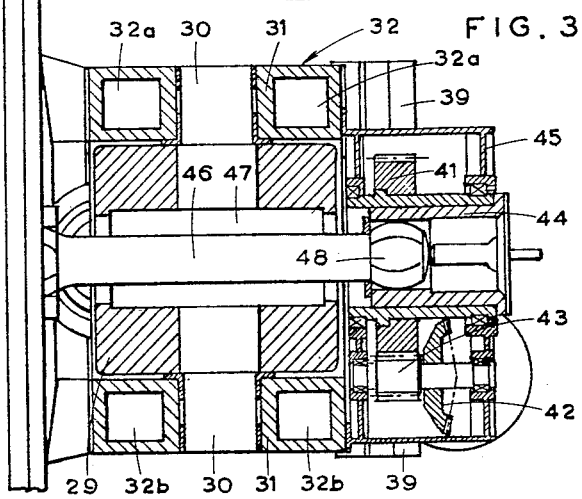
INVENTORS
PATRICK ALWYNE CLARK
DENNIS STUBBS
DENNIS GEORGE BLOOMFIELD
BY
*Larson and Taylor*
ATTORNEY Jan. 2, 1962     P. A. CLARK ET AL     3,015,528
THRUST BEARINGS Filed Aug. 15, 1958                    5 Sheets-Sheet 4

INVENTORS
PATRICK ALWYNE CLARK
DENNIS STUBBS
DENNIS GEORGE BLOOMFIELD

BY

ATTORNEY

Jan. 2, 1962   P. A. CLARK ET AL   3,015,528
THRUST BEARINGS

Filed Aug. 15, 1958   5 Sheets-Sheet 5

INVENTORS
PATRICK ALWYNE CLARK
DENNIS STUBBS
DENNIS GEORGE BLOOMFIELD
BY
ATTORNEY

United States Patent Office 3,015,528
Patented Jan. 2, 1962

3,015,528
THRUST BEARINGS
Patrick Alwyne Clark, Norton, Sheffield, Dennis Stubbs, Sheffield, and Dennis George Bloomfield, Rotherham, England, assignors to Davy and United Engineering Company Limited
Filed Aug. 15, 1958, Ser. No. 755,286
Claims priority, application Great Britain Aug. 16, 1957
7 Claims. (Cl. 308—231)

This invention relates to thrust bearings and particularly to bearings for tilting rotors; for example, tilting rotary furnaces as used in certain modern methods of converting pig iron to steel. Such a furnace comprises a vessel lined with refractory material, rotatable about a longitudinal axis, formed with an opening at one end, and capable of being turned about an axis, at right angles to the axis of rotation, to various operative positions. The vessel (which may include an outer sleeve in which it is detachably fixed) is not, as a rule, required to rotate when in each such position and may be required to rotate in only one of the operative positions, namely, the refining position. Nevertheless, owing to the substantial weight of the vessel, particularly when full, certain problems arise in connection with the supporting means or bearings for the rotary vessel in view of the thermal expansion that takes place in the refining operation and of the substantial redistribution of load that occurs when the vessel is tilted from one position to the next, particularly as the tilt has to be communicated to the vessel through the bearings in which it rotates. Moreover, variations due to wear must be readily accommodated. The main object of the present invention is to provide a bearing arrangement that may readily be used for overcoming these difficulties, although it may clearly be applied to many other arts.

According to the present invention, a thrust bearing assembly includes rollers respectively mounted on rockers and arranged to roll on an annular track when relative rotation between the rockers and the track takes place, the axes of the rockers being located substantially tangentially with respect to the track and located on means mounted to react against a thrust which is directed along the axis of the track and which is transmitted to the said means by the rocker pivots. The track may be a conical track and the rollers conical with their axes substantially at right angles to the axis of the track, and the track may be formed on a rotor, such as the vessel of a rotary furnace, rotatable in a frame carrying the rockers. Each rocker axis is preferably located so that the resultant thrust on the associated roller intersects that axis. There may be two rockers pivoted respectively at opposite ends of a beam which constitutes the aforesaid means and is pivotally mounted to rock about an axis at right angles to and intersecting the rotor axis. Alternatively the rockers may be pivoted respectively to members pivoted to the frame and located diametrically opposite one another, the members being connected together by a resilient connection arranged to yield so as to accommodate roughnesses in the annular track.

In order that the invention may be clearly understood and readily carried into effect, one construction in accordance therewith will now be described, by way of example, with reference to the accompanying drawings, in which:

FIGURE 2 is a cross-section on the line II—II in FIGURE 1;

FIGURE 3 is a sectional elevation on an enlarged scale, of a portion of the furnace of FIGURES 1 and 2, the section being taken on the line III—III in FIGURE 1;

Figure 1:
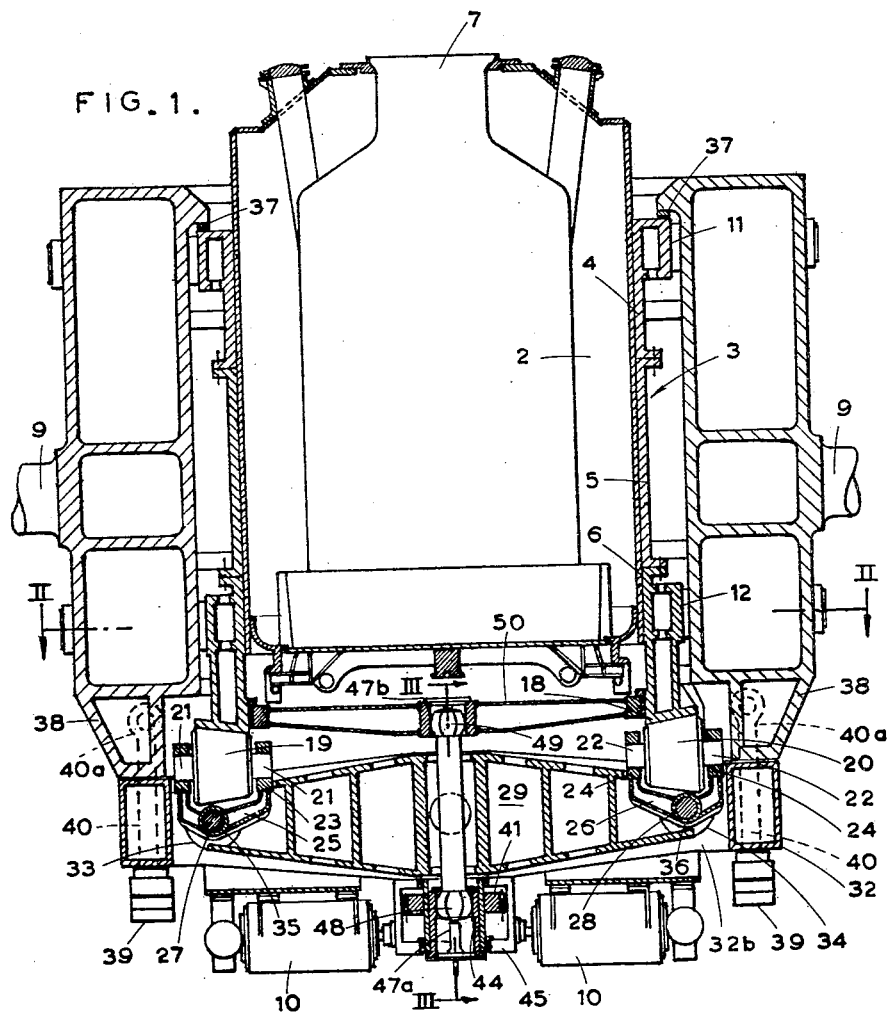
FIGURE 1 is a sectional elevation of a rotary furnace for the production of steel, the furnace being shown in the upright position.
Figure 4:
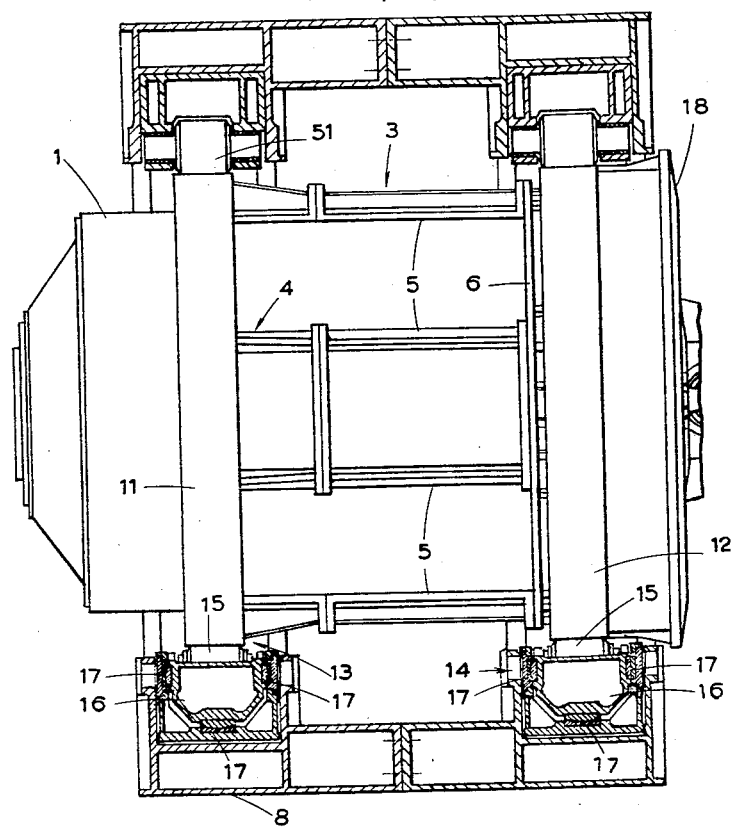
FIGURE 4 is a sectional elevation of a portion of the furnace, the section being taken on the line IV—IV in FIGURE 2.

In the example of FIGURES 1 to 4, a steel cylindrical vessel 1 is lined with refractory material 2 and is removably fixed in a sleeve 3 fabricated from three sections 4, 5, 6, the section 5 being divided into four circumferential parts. The vessel is closed at its lower end, as viewed in FIGURE 1, but has a central mouth or opening 7 at its upper end. The vessel unit 1, 2, 3 is mounted to rotate about its axis in a cylindrical frame 8 that embraces most of the length of the vessel unit 1, 2, 3. The frame 8 is mounted to tilt on horizontal trunnions 9 that lie on an axis that intersects the axis of the vessel a little more than a quarter of the way along the vessel from its closed end. The trunnions are mounted in journal bearings located in a fixed support, and a motor, acting through appropriate mechanism, is arranged to tilt the frame 8 and vessel unit 1, 2, 3 to various operative positions about the axis of the trunnions 9. These positions include the charging position in which the vessel axis includes an angle of 10° of arc with the horizontal, a refining position in which this angle is increased to 15°20′, a slagging position which is 10° below the horizontal, and a sampling position in which the vessel axis is horizontal, all these positions being such that the mouth 7 of the vessel is on the same side of the vertical. There is also a tapping position in which the vessel unit is swung through 190° from the horizontal position and over the vertical position, and also a position in which the vessel unit is inverted with its axis vertical for the clearance of residual material and for the removal of the vessel 1. At least in the refining position, the vessel unit is rotated about its axis by two motors 10 carried by the frame 8 and acting through mechanism described below.

The annular sections 4, 6 are formed with two circumferential and similar tracks 11, 12. When the vessel unit is substantially horizontal, as shown in FIGURE 2, these tracks 11, 12 run on two pairs 13, 14 of roller bearings. Each roller bearing 13 or 14 comprises two rollers 15 respectively mounted to rotate about axes fixed in a trough or cage 16 mounted for universal movement in spherical bearings 17 in the cylindrical frame 8. As the vessel unit is tilted towards the vertical position a diminishing component of the weight of the vessel unit remains applied to the rollers 15.

The vessel unit is further provided with a third track which is an annular conical track 18 formed on the free end of the section 6. When the vessel unit 1, 2, 3 and frame 8 are vertical with the closed end of the vessel 1 at the bottom, this track faces downwards and rests on diametrically opposed taper rollers 19, 20, tapered to match the conicity of the track 18, the taper, of course, being such that normally there is no sliding contact between any part of the rollers 19, 20 and the track 18. In the vertical position the load taken by these rollers 19, 20 is, of course, the entire weight of the vessel unit and its contents and this load diminishes to zero as the vessel unit is tilted to the horizontal position. Each roller 19, 20 is carried by journals 21 or 22 mounted in journal bearings 23 or 24 in a rocker 25 or 26 pivoted beneath the roller about the axis of a pin 27 or 28, at right angles to the roller axis, to one end of a beam 29. The beam 29 is a box structure carrying the rockers at opposite ends and pivoted at its centre about a horizontal axis at right angles to the axis of the trunnions 9. This enables the vessel unit 1, 2, 3 to accommodate itself to the circumferential bearings as the frame 8 is tilted. The central pivot for the beam 29 is provided by trunnions 30 journalled in bearings 31 in a divided transom or cross-member 32 which forms part of the frame 8 and extends diametrically across the closed end of the vessel 1, the beam 29 being located between the two limbs 32a, 32b, of the transom.

The rockers 25, 26 project into hollow ends 33, 34 of the beam 32 and are formed with journal bearings 35, 36 pivoted on the pins 27, 28 which extend through the hollow ends 33, 34 and are carried by the beam 29 parallel to the trunnions 30. The location of each of these pins 27, 28 relatively to the associated taper roller 19 or 20 is such that it lies closer to the wide end of the roller than to the narrow end of the roller. Thus, the resultant thrust of the track 18, when the vessel unit 1, 2, 3 is upright, on each roller 19, 20 intersects the axis of the associated pin 27 or 28. Moreover, each roller and rocker unit is substantially statically balanced about the said axis.

When the vessel is turned from the upright position to the inverted position, in particular for the purpose of clearing residual material, the vessel unit 1, 2, 3 undergoes a small axial movement before the free end of the section 4 rests against pads 37 on the frame 8.

The transom 32 is clamped in position against portions 38 of the frame 8 by the heads 39 on four rods 40 that pass through the transom 32 and are anchored to the frame 8 by pin joints 40a. The heads 39 may include nuts that can be tightened by screwing along the rods 40, with resilient elements interposed between the nuts and the transom 32.

The vessel unit 1, 2, 3 is rotated within the frame 8 by the aforesaid electric motors 10 carried by the transom 32. The driving mechanism includes a crown bevel wheel 42 (FIGURE 3), driven by bevel pinions (not shown) on the motor shafts, the motors being arranged to rotate in opposite directions about a common axis. Fixed co-axially to the bevel wheel 42 is a pinion 43 in mesh with a toothed ring 41 fixed peripherally to a tubular member 44 mounted to rotate in a casing 45 fixed to the transom 32. The drive is transmitted from the tubular member 44 by a shaft 46 that passes with clearance through a passage 47 through the centre of the beam 29, between the trunnions 30. The ends of the shaft 46 are formed with spherical splines 48, 49 that engage rectilinear splines respectively in the tubular member 44 and in the centre of a four-armed spider 50 having its extremities fixed to the sleeve section 6. This form of drive enables the vessel unit 1, 2, 3 to undergo small radial and axial movements relatively to the frame 8 without straining the shaft 46. Longitudinal movement of the shaft is limited by stops 47a, 47b.

Four auxiliary rollers 51, 52 are mounted in the frame 8 to provide bearings for the tracks 11, 12 when the vessel unit 1, 2, 3 is swung over the upright position from the side on which it is supported by the rollers 15, that is to say from the side on which most of the work is done.

Figure 5:
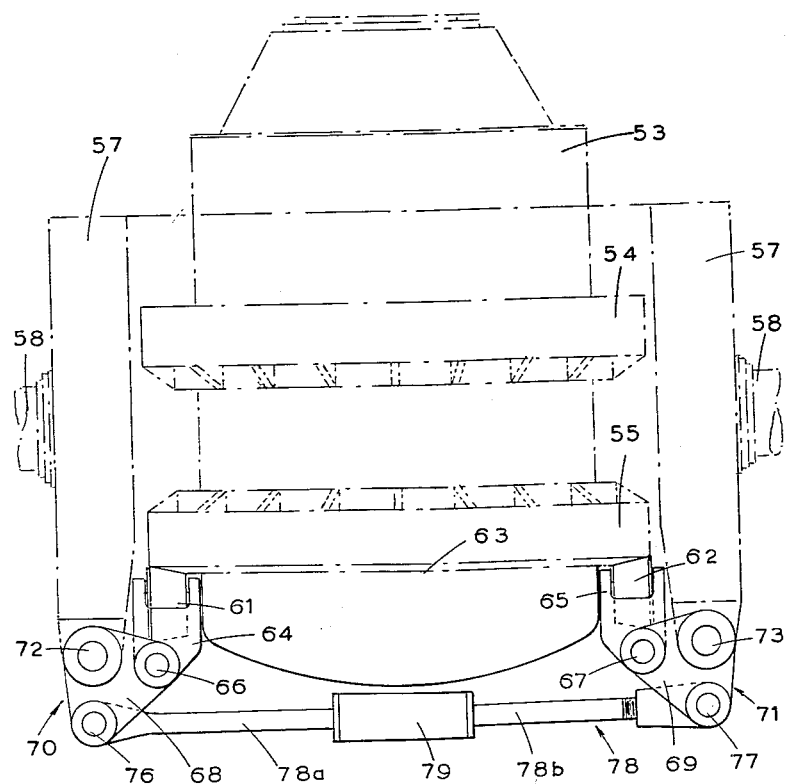
FIGURE 5 is a diagrammatic side elevation of a modification of the furnace of FIGURES 1 to 4.
Figure 6:
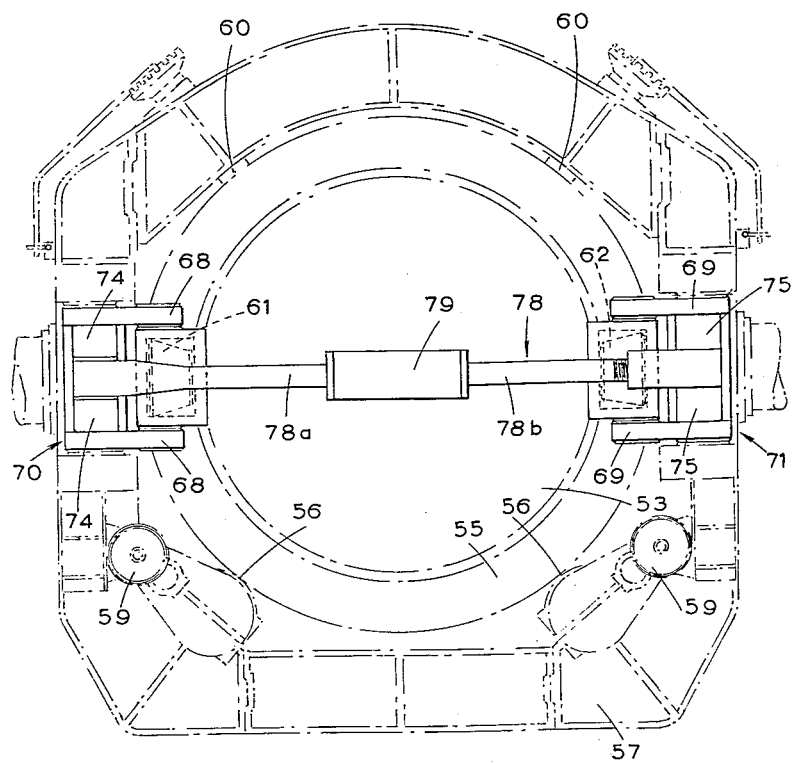
FIGURE 6 is a diagrammatic plan of the furnace of FIGURE 5 as seen from below.

In the modification of FIGURES 5 and 6, the vessel unit 53 has two circumferential tracks 54, 55 that run on four rollers 56 when the vessel unit 53 is tilted into such a position that it bears on these rollers. The rollers 56 are mounted in a frame 57 having trunnions 58 carried by a stationary support (not shown). Rotation of the vessel unit 53 about its axis is effected, when required, by friction, two of the rollers 56 being driven by motors 59. When the frame 57 and vessel unit 53 are swung over the vertical position about the axis of the trunnions 58, the tracks 54, 55 bear on friction pads 60.

In this construction of FIGURES 5 and 6 conical rollers 61, 62, which bear on a conical track 63, are carried by rockers 64, 65 respectively pivoted on pins 66, 67 between pairs of triangular side plates 68, 69 forming parts of bell crank levers 70, 71 pivotally mounted by means of shafts 72, 73 on the frame 57. The plates in each pair of triangular side plates 68, 69 are formed with pairs of bushes 74, 75 carrying spindles 76, 77 for the ends of a connecting link 78. The link 78 is in two parts 78a, 78b, one of which carries a cylinder 79 and the other of which carries a piston reciprocable within the cylinder 79, a resilient compression means being interposed between the piston and one end of the cylinder to provide a shock absorber to accommodate any roughness in the track rings. To limit the very small movement of the rollers 61, 62 about the axes of the shafts 72, 73, when the vessel unit 53 is vertical, or nearly vertical, with its mouth uppermost, stops (not shown) are provided to limit the extension of the link.

Pads (not shown) equivalent to the pads 37 of FIGURE 1 are provided for limiting the axial movement of the vessel unit when inverted.

We claim:

1. A thrust bearing assembly including, in combination, means presenting on one face a circular track, supporting means, said track means and said supporting means being mounted for relative rotation about the axis of said track, a two-armed beam mounted on said supporting means to rock about an axis at right angles to said first mentioned axis, rockers pivoted respectively at the ends of said beam about axes that are tangential to said track, and rollers respectively mounted to rotate about axes fixed in said rockers, said roller axes being at right angles to said rocker axes and displaced therefrom towards said track, said rollers being arranged to run round said track during said relative rotation.

2. A thrust bearing assembly including in combination, two members mounted for relative rotation about a common axis, one of said members being formed with a circular, conical track facing towards the second member, a two-armed beam mounted on said second member to rock about an axis at right angles to said first-mentioned axis, rockers pivoted respectively at the ends of said beam about axes that are tangential to said track, and conical rollers respectively mounted to rotate about axes fixed in said rockers and to run on said track, said roller axes being substantially at right angles to said first-mentioned axis, at right angles to said rocker axes and displaced from said rocker axes towards said track, and each rocker axis being located in a flat plane to which the associated roller axis is perpendicular and which is closer to the wider end of the roller than to the narrower end of the roller, the wider end being radially outermost with respect to said first-mentioned axis.

3. A thrust bearing assembly including, in combination, means presenting on one face a circular track, supporting means, said track means and said supporting means being mounted for relative rotation about the axis of said track, diametrically opposed taper rollers mounted to run on said track with their wider ends on the outer periphery of said track and their narrower ends on the inner periphery of said track, two rockers mounted to rock about axes and respectively carrying said rollers, each roller being mounted to rotate about an axis fixed with respect to its respective rocker, and mechanism mounted on said supporting means for carrying said rockers and adapted to permit a seesaw movement of said rockers such that when one rocker moves in one direction normally to said track, the other rocker moves in the other direction normally to said track.

4. A thrust bearing assembly according to claim 3, in which said mechanism includes two bell crank levers, each pivoted to said supporting means, one rocker being pivoted to a first arm on one bell crank lever and the other rocker being pivoted to a corresponding arm on the second bell crank lever, and a link pivoted at its opposite ends to the second arms of said bell cranks.

5. A rotary furnace including in combination, a frame mounted to tilt about a substantially horizontal axis, a vessel, bearing means in said frame for supporting said vessel so as to rotate about a central axis through said vessel at right angles to said first-mentioned axis, said vessel being formed with two peripheral cylindrical tracks and with a third track, said third track being a circular track facing generally in the direction of the vessel axis and said bearing means including anti-friction rollers for said cylindrical tracks and diametrically opposed taper thrust bearings for running on said third track with their wider ends on the outer periphery of said third track and their narrower ends on the inner periphery of said third track, two rockers mounted to rock about axes at right angles to the axes of said taper rollers and respectively carrying said taper rollers, each taper roller being mounted to rotate about an axis fixed with respect to its respective rocker, and mechanism mounted on said frame for carrying said rockers and adapted to permit a seesaw movement of said rockers such that when one rocker moves in one direction normally to said third track, the other rocker moves in the other direction normally to said third track.

6. A rotary furnace according to claim 5, in which said mechanism includes two bell crank levers, each pivoted to said frame, one being pivoted to a first arm of one bell crank lever and the other rocker being pivoted to a corresponding arm on the second bell crank lever, and a link pivoted at its opposite ends to the second arms of said bell cranks.

7. A rotary furnace assembly including, in combination, a frame mounted to tilt about a substantially horizontal axis, a vessel, bearing means in said frame for supporting said vessel so as to rotate about a central axis through said vessel at right angles to said first-mentioned axis, said vessel being formed with two peripheral cylindrical tracks and one conical end track, said bearing means including anti-friction rollers for said cylindrical tracks, conical end thrust rollers having their wide ends radially outermost and their axes substantially at right angles to the axis of said vessel for travelling around said end track, rockers respectively allocated to said rollers, said rollers being mounted to rotate about axes fixed in said rockers, and pivotal supports on said frame for said rockers, said supports consisting of a beam mounted on said frame to rock about an axis intersecting the longitudinal axis of said vessel at substantially right angles.

References Cited in the file of this patent

UNITED STATES PATENTS

| 760,941 | Wilson | May 24, 1904 |
| 2,072,219 | Robison | Mar. 2, 1937 |

FOREIGN PATENTS

| 776,962 | Great Britain | June 12, 1957 |